(12) United States Patent
Sugaya

(10) Patent No.: US 8,654,363 B2
(45) Date of Patent: Feb. 18, 2014

(54) INFORMATION PROCESSING SYSTEM, INFORMATION PROCESSING APPARATUS, SETTING ITEM SETTING METHOD, AND NON-TRANSITORY COMPUTER-READABLE RECORDING MEDIUM ENCODED WITH SETTING ITEM SETTING PROGRAM

(75) Inventor: Takashi Sugaya, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 322 days.

(21) Appl. No.: 13/236,721

(22) Filed: Sep. 20, 2011

(65) Prior Publication Data

US 2012/0081732 A1    Apr. 5, 2012

(30) Foreign Application Priority Data

Sep. 30, 2010   (JP) ................. 2010-221256

(51) Int. Cl.
| | |
|---|---|
| *G06F 3/12* | (2006.01) |
| *G06F 15/00* | (2006.01) |
| *G06F 3/00* | (2006.01) |
| *G06K 15/00* | (2006.01) |

(52) U.S. Cl.
USPC ........... 358/1.13; 358/1.9; 358/1.14; 715/747

(58) Field of Classification Search
None
See application file for complete search history.

(56) References Cited

U.S. PATENT DOCUMENTS

| 7,755,780 | B2 | 7/2010 | Ohta et al. | |
|---|---|---|---|---|
| 2004/0027624 | A1* | 2/2004 | Parulski et al. | 358/527 |
| 2007/0027895 | A1* | 2/2007 | Bridges et al. | 707/102 |
| 2008/0250494 | A1 | 10/2008 | Nagata | |
| 2009/0094539 | A1 | 4/2009 | Wang et al. | |
| 2010/0107065 | A1 | 4/2010 | Shima et al. | |

FOREIGN PATENT DOCUMENTS

| JP | 2005-242782 A | 9/2005 |
|---|---|---|
| JP | 2006-127181 A | 5/2006 |
| JP | 2007-55099 A | 3/2007 |
| JP | 2007-140588 A | 6/2007 |
| JP | 2008-258893 A | 10/2008 |
| JP | 2009-59363 A | 3/2009 |
| JP | 2009-217672 A | 9/2009 |

(Continued)

OTHER PUBLICATIONS

Office Action (Notice of Ground of Rejection) dated Oct. 9, 2012, issued in corresponding Japanese Patent Application No. 2010-221256, and an English Translation thereof. (5 pages).

*Primary Examiner* — Thomas Lett
(74) *Attorney, Agent, or Firm* — Buchanan Ingersoll & Rooney PC

(57) ABSTRACT

An information processing system includes a peripheral device at least having a printer function and an information processing apparatus controlling the peripheral device. The peripheral device includes: a display portion; a process execution portion to execute prescribed processing; a storage portion to store user-specific data; and a metadata return portion to refer to the user-specific data in response to reception of a metadata request from the information processing apparatus and to extract and return metadata associated with user identification information included in the received metadata request. The information processing apparatus includes: a first authentication portion to authenticate a user; an execution portion to execute an execution application selected from a plurality of application programs; a metadata request portion to transmit a metadata request; and a reference setting portion to set whether to display a plurality of execution setting items that can be set in the execution application program.

13 Claims, 10 Drawing Sheets

(56) References Cited

FOREIGN PATENT DOCUMENTS

| | | | |
|---|---|---|---|
| JP | 2010-011227 A | 1/2010 |
| JP | 2010-108022 A | 5/2010 |
| JP | 2010-122809 A | 6/2010 |

* cited by examiner

F I G. 2
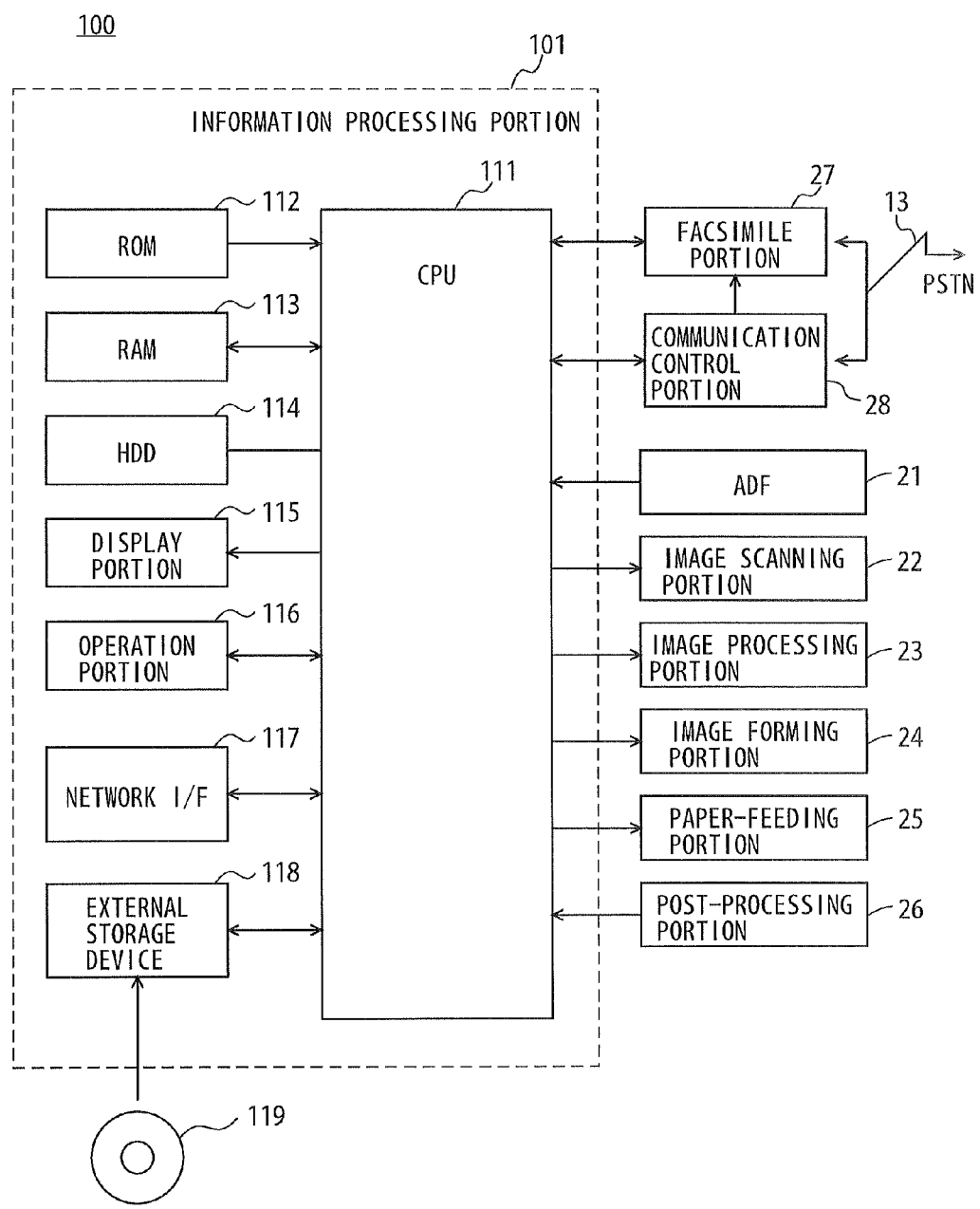

FIG. 5

MAIN UNIT SETTING INFORMATION                                      81

| USER IDENTIFICATION INFORMATION | OPERATION SCREEN NAME | SETTING ITEM | DISPLAY/ NOT DISPLAY |
|---|---|---|---|

FIG. 6

METADATA

| DEVICE NAME | FUNCTION NAME | SETTING ITEM | DISPLAY/ NOT DISPLAY |
|---|---|---|---|

F I G. 8

APP SETTING INFORMATION 271

| USER IDENTIFICATION INFORMATION | SETTING ITEM NAME | DISPLAY/ NOT DISPLAY |
|---|---|---|

F I G. 9

| NUMBER OF COPIES | 1 | COPY |
|---|---|---|
| DUPLEX | OFF ▼ | |
| SORT | ON ▼ | |
| PAPER SIZE | A4 ▼ | |
| STAPLE | OFF ▼ | |
| STAMP | OFF ▼ | |

SET

F I G. 10

| NUMBER OF COPIES | 1 | COPY |
|---|---|---|
| DUPLEX | OFF ▼ | |
| SORT | ON ▼ | |

SET

F I G. 1 1

| DEVICE NAME | FUNCTION NAME | SETTING ITEM | DISPLAY/ NOT DISPLAY |
|---|---|---|---|
| PC A | PRINT | NUMBER OF COPIES | 1 |
| PC A | PRINT | DUPLEX | 1 |
| PC A | PRINT | SORT | 1 |
| PC A | PRINT | PAPER SIZE | 0 |
| PC A | PRINT | STAPLE | 0 |
| PC A | PRINT | STAMP | 0 |

INFORMATION PROCESSING SYSTEM, INFORMATION PROCESSING APPARATUS, SETTING ITEM SETTING METHOD, AND NON-TRANSITORY COMPUTER-READABLE RECORDING MEDIUM ENCODED WITH SETTING ITEM SETTING PROGRAM

This application is based on Japanese Patent Application No. 2010-221256 filed with Japan Patent Office on Sep. 30, 2010, the entire content of which is hereby incorporated by reference.

BACKGROUND OF THE INVENTION

1. Field of the Invention

The present invention relates to an information processing system, an information processing apparatus, a setting item setting method, and a non-transitory computer-readable recording medium encoded with a setting item setting program. More specifically, the present invention relates to an information processing system including a peripheral device and an information processing apparatus controlling the peripheral device, the information processing apparatus, a setting item setting method executed in the information processing apparatus, and a non-transitory computer-readable recording medium encoded with a setting item setting program.

2. Description of the Related Art

In recent years, personal computers (hereinafter referred to as "PCs") can control peripheral devices such as MFPs to allow MFPs to execute printing, scanning, data transmission, and the like. The PCs controlling MFPs are installed with a driver program for controlling the MFPs. On the other hand, an operation screen displayed by the driver program to serve as a user interface can be customized so as to display the fields desired by users. Japanese Patent Laid-Open No. 2005-242782 discloses a technique for increasing the efficiency of customization by users. According to Japanese Patent Laid-Open No. 2005-242782, an information processing apparatus including a driver for making function settings for a prescribed device through a user interface includes management means for managing the customize information for each function that can be set by the user interface and control means for performing customize control of function display that can be set by the user interface.

However, the conventional information processing apparatus can customize the same driver program installed in a plurality of PCs but cannot do the same customization among different applications.

SUMMARY OF THE INVENTION

In order to achieve the aforementioned object, in accordance with an aspect of the present invention, an information processing system includes a peripheral device at least having a printer function and an information processing apparatus controlling the peripheral device. The peripheral device includes: a display portion to display a first operation screen for setting parameters in a plurality of setting items; a process execution portion to execute prescribed processing in accordance with the parameters set in the plurality of setting items; a storage portion to store user-specific data in which user identification information for identifying a user is associated with metadata indicating whether to display each of the plurality of setting items; and a metadata return portion to refer to the user-specific data in response to reception of a metadata request from the information processing apparatus and to extract and return metadata associated with user identification information included in the received metadata request. The information processing apparatus includes: a first authentication portion to authenticate a user; an execution portion to execute an execution application selected from a plurality of application programs for remotely controlling the peripheral device; a metadata request portion to transmit a metadata request including user identification information of the authenticated user to the peripheral device, in response to acceptance of a custom instruction for execution setting items included in a second operation screen of the execution application by the user authenticated by the first authentication portion; and a reference setting portion to set whether to display a plurality of execution setting items that can be set in the execution application program, among the plurality of setting items, based on the metadata received from the peripheral device in response to transmission of the metadata request.

In accordance with another aspect of the present invention, an information processing apparatus controls a peripheral device at least having a printer function. The peripheral device stores user-specific data in which user identification information for identifying a user is associated with metadata indicating whether to display each of a plurality of setting items in which parameters are set in order that the peripheral device can execute prescribed processing. The information processing apparatus includes: an authentication portion to authenticate a user; an execution portion to execute an execution application selected from a plurality of application programs for remotely controlling the peripheral device; a metadata request portion to transmit a metadata request including user identification information of the authenticated user to the peripheral device, in response to acceptance of a custom instruction for execution setting items included in an operation screen of the execution application by the user authenticated by the authentication portion; and a reference setting portion to set whether to display a plurality of execution setting items that can be set in the execution application program, among the plurality of setting items, based on the metadata received from the peripheral device in response to transmission of the metadata request.

In accordance with a further aspect of the present invention, a setting item setting method is executed in an information processing apparatus controlling a peripheral device at least having a printer function. The peripheral device stores user-specific data in which user identification information for identifying a user is associated with metadata indicating whether to display each of a plurality of setting items in which parameters are set in order that the peripheral device can execute prescribed processing. The method includes the steps of authenticating a user; executing an execution application selected from a plurality of application programs for remotely controlling the peripheral device; transmitting a metadata request including user identification information of the authenticated user to the peripheral device, in response to acceptance of a custom instruction for execution setting items included in an operation screen of the execution application by the user authenticated in the step of authenticating; and setting whether to display a plurality of execution setting items that can be set in the execution application program, among the plurality of setting items, based on the metadata received from the peripheral device in response to transmission of the metadata request.

In accordance with yet another aspect of the present invention, a non-transitory computer-readable recording medium is encoded with a setting item setting program performed by a computer. The computer is configured to control an information processing apparatus controlling a peripheral device at least having a printer function. The peripheral device stores user-specific data in which user identification information for identifying a user is associated with metadata indicating whether to display each of a plurality of setting items in which parameters are set in order that peripheral device can execute prescribed processing. The program causes the computer to execute the steps of: authenticating a user; executing an execution application selected from a plurality of application programs for remotely controlling the peripheral device; transmitting a metadata request including user identification information of the authenticated user to the peripheral device, in response to acceptance of a custom instruction for execution setting items included in an operation screen of the execution application by the user authenticated in the step of authenticating; and setting whether to display a plurality of execution setting items that can be set in the execution application program, among the plurality of setting items, based on the metadata received from the peripheral device in response to transmission of the metadata request.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 2 is a block diagram showing an exemplary hardware configuration of an MFP.

FIG. 5 is a diagram showing an exemplary format of main unit setting information.

FIG. 6 is diagram showing an exemplary format of metadata.

FIG. 8 is a diagram showing an exemplary format of app setting information.

FIG. 9 is a diagram showing an example of a default operation screen.

FIG. 10 is a diagram showing an example of a customized operation screen.

FIG. 11 is a diagram showing an example of metadata.

DESCRIPTION OF THE PREFERRED EMBODIMENTS

Figure 1:
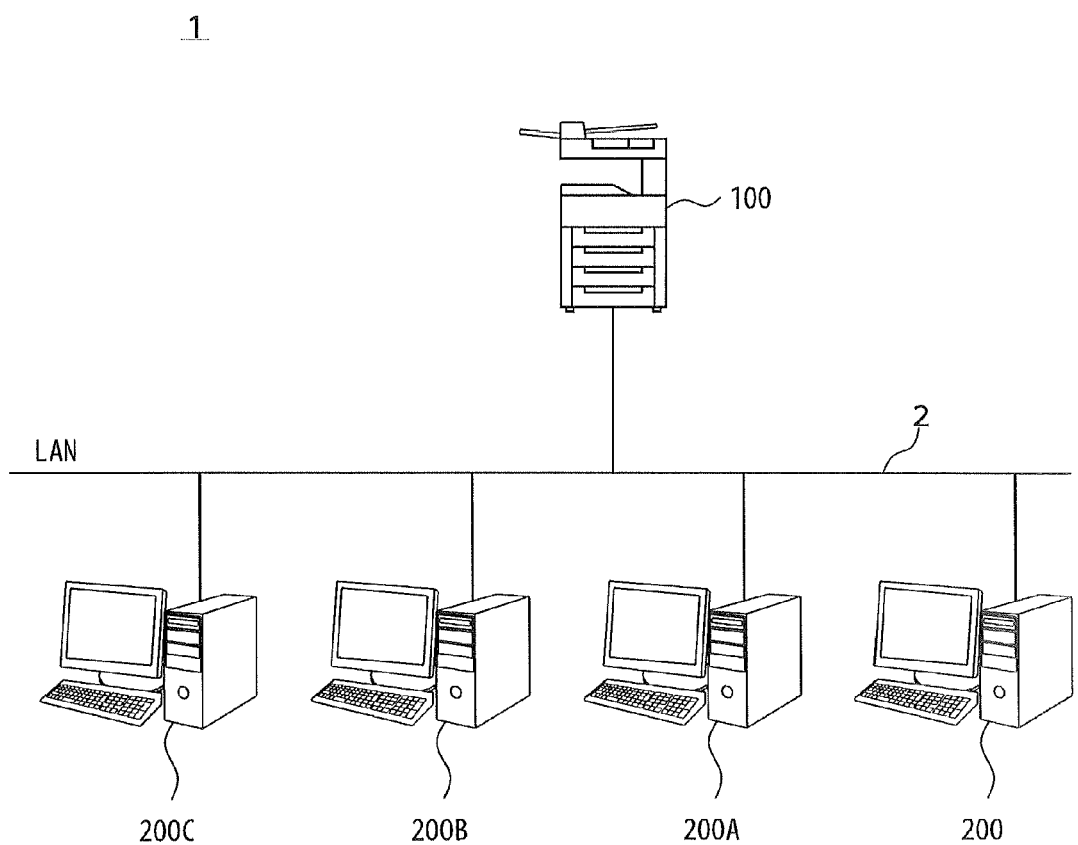
FIG. 1 is a diagram showing an exemplary information processing system in an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 is a diagram showing an exemplary information processing system in an embodiment of the present invention. Referring to FIG. 1, an information processing system 1 includes an MFP (Multi Function Peripheral) 100 and PCs 200, 200A-200C. MFP 100 and PCs 200, 200A-200C are connected to a local area network (hereinafter referred to as "LAN") 2. Although FIG. 1 illustrates information processing system 1 including MFP 100 and four PCs 200, 200A-200C as an example, the number of them is not limited.

MFP 100 is an exemplary peripheral device and includes multiple functions such as a scanner function, a printer function, a copy function, and a facsimile function. MFP 100 can communicate with PCs 200, 200A-200C via LAN 2. PCs 200, 200A-200C are general computers and their hardware configuration and functions are well known. Therefore, a description thereof will not be repeated here.

In the shown example, MFP 100 and PCs 200, 200A-200C are connected by LAN 2. However, they may be connected by a serial communication cable or a parallel communication cable. The communication may be either wired or wireless.

FIG. 2 is a block diagram showing an exemplary hardware configuration of the MFP. Referring to FIG. 2, MFP 100 includes an information processing portion 101, a facsimile portion 27, a communication control portion 28, an automatic document feeder (ADF) 21, an image scanning portion 22, an image processing portion 23, an image forming portion 24, a paper-feeding portion 25, and a post-processing portion 26. Information processing portion 101 includes a Central Processing Unit (CPU) 111, a ROM (Read Only Memory) 112 storing, for example, a program to be executed by CPU 111, a RAM (Random Access Memory) 113 to be used as a work area of CPU 111, a hard disk drive (HDD) 114 for storing data in a nonvolatile manner, a display portion 115, an operation portion 116, a network interface (I/F) 117, and an external storage device 118. CPU 111 is connected to ROM 112, RAM 113, HDD 114, display portion 115, operation portion 116, network I/F 117, and external storage device 118 to control the entire information processing portion 101. CPU 111 is also connected to facsimile portion 27, communication control portion 28, ADF 21, image scanning portion 22, image processing portion 23, image forming portion 24, paper-feeding portion 25, and post-processing portion 26 to control the entire MFP 100.

ADF 21 conveys multiple sheets of a document placed on a platen to image scanning portion 22, sheet by sheet. In order to allow image scanning portion 22 to scan both sides of a document, ADF 21 conveys the document to image scanning portion 22 to have the front surface scanned, and thereafter conveys the reversed document to image scanning portion 22 to have the back surface scanned. Image scanning portion 22 optically reads image information such as photos, characters, or pictures from a document and outputs the obtained image data to image processing portion 23.

Image processing portion 23 is controlled by CPU 111 and performs image processing on image data based on an instruction from CPU 111. Image data includes image data output by image scanning portion 22 scanning a document, image data included in a print job received by network I/F 117 from PCs 200, 200A-200C, and image data stored in HDD 114. The image processing includes, for example, an enlargement process of enlarging an image, a reduction process of reducing an image, a combination process of combining a plurality of images to produce one image, and a rotation process of rotating an image to change an orientation. Image processing portion 23 outputs the processed image data to image forming portion 24.

Paper-feeding portion 25 has a plurality of paper-feed trays and supplies paper stored in the designated paper-feed tray to image forming portion 24, sheet by sheet. Each of a plurality of paper-feed trays accommodates paper of a size selected from a plurality of sizes in a direction selected from a plurality of directions. Here, paper-feeding portion 25 has first to fourth paper-feed trays. The first paper-feed tray accommodates A4 size paper in portrait orientation. The second paper-feed tray accommodates A4 size paper in landscape orientation. The third paper-feed tray accommodates A3 size paper in portrait orientation. The fourth paper-feed tray accommodates B5 size paper in landscape orientation. When duplex print is designated, paper-feeding portion 25 turns over paper conveyed to image forming apparatus 24 and conveys the reversed paper again to image forming portion 24 in order to form images on both sides of paper.

Image forming portion 24 forms an image on paper conveyed from paper-feeding portion 25, based on image data input from image processing portion 23.

Post-processing portion 26 discharges paper having an image formed thereon. Post-processing portion 26 has a plurality of paper-exit trays and includes a sorting portion, a punched hole processing portion, and a staple processing portion. The sorting portion sorts multiple sheets of paper having images formed thereon and outputs the sorted sheets to a plurality of paper-exit trays. The punched hole processing portion punches a hole in paper. The staple processing portion staples together multiple sheets of paper having images formed thereon.

Display portion 115 is a display such as a liquid crystal display (LCD) or an organic ELD (Electro Luminescence Display) and displays, for example, instruction menus for users and information concerning the obtained image data. Operation portion 116 includes a plurality of keys and accepts input of a variety of instructions and data such as characters and numerals through user's operations corresponding to the keys. Operation portion 116 further includes a touch panel provided on display portion 115. Display portion 115 and operation portion 116 constitute operation panel 11.

Network I/F 117 is an interface for communicating using a communication protocol such as TCP (Transmission Control Protocol) or UDP (User Datagram Protocol) and communicates with PCs 200, 200A connected to LAN 2.

A CD-ROM 119 is attached to external storage device 118. CPU 111 can access CD-ROM 119 through external storage device 118 and can load a program stored in CD-ROM 119 into RAM 113 for execution. The program executed by CPU 111 is not limited to a program stored in CD-ROM 119 and may be a program stored in any other recording medium, a program stored in HDD 116, or a program written into HDD 114 by another computer connected to LAN 2 through network I/F 117.

A recording medium for storing a program is not limited to CD-ROM 119 and may be an optical disk (MO (Magnetic Optical Disc)/MD (Mini Disc)/DVD (Digital Versatile Disc)), an IC card, an optical card, or a semiconductor memory such as a mask ROM, EPROM (Erasable Programmable ROM), or EEPROM (Electrically Erasable and Programmable ROM).

Facsimile portion 27 is connected to PSTN 13 and transmits facsimile data to PSTN 13 or receives facsimile data from PSTN 13. Facsimile portion 27 converts the received facsimile data into print data printable by image forming portion 24 and outputs the print data to image forming portion 24. Thus, image forming portion 24 prints the facsimile data received by facsimile portion 27 on paper. Facsimile portion 27 converts data stored in HDD 114 into facsimile data and transmits the facsimile data to a facsimile machine connected to PSTN 13.

Figure 3:
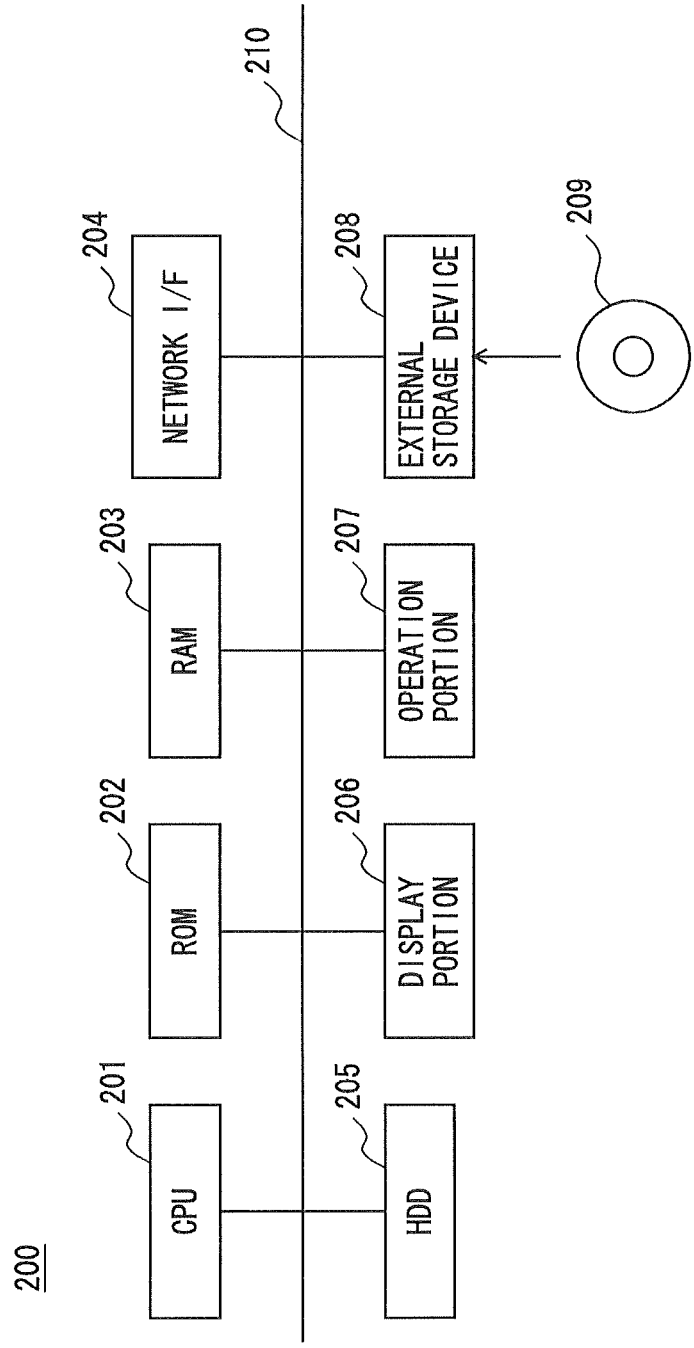
FIG. 3 is a block diagram showing an exemplary hardware configuration of a PC.

PCs 200, 200A-200C have the same hardware configuration and functions, and therefore, PC 200 will be taken here as an example. FIG. 3 is a block diagram showing an exemplary hardware configuration of the PC.

Referring to FIG. 3, PC 200 includes a CPU 201 for controlling the entire PC 200, a ROM 202 for storing, for example, a program to be executed by CPU 201, a RAM 203 to be used as a work area of CPU 201, a network I/F 204 for connecting PC 200 to a network, an HDD 205 as a mass storage device, a display portion 206, an operation portion 207 accepting input of user's operations, and an external storage device 208 to which a CD-ROM 209 is attached.

CD-ROM 209 is attached to external storage device 208. An application program such as a driver program for controlling MFP 100 is stored in CD-ROM 209. CPU 201 controls external storage device 208 to read out the application program from CD-ROM 209 and loads the read application program into RAM 203 for execution.

The recording medium for storing a program is not limited to CD-ROM 209 and may be a flexible disk, a cassette tape, an optical disk (MO (Magnetic Optical Disc)/MD (Mini Disc)/DVD (Digital Versatile Disc)), an IC card, an optical card, or a semiconductor memory such as a mask ROM, EPROM (Erasable Programmable ROM), or EEPROM (Electrically EPROM). CPU 201 may download a program from another computer connected to LAN 2 for storage into HDD 205. Alternatively, another computer may write a program into HDD 205, so that the program stored in HDD 205 is loaded into RAM 203 and executed by CPU 201. The program referred to herein includes not only a program directly executable by CPU 201 but also a source program, a compressed program, and an encrypted program.

Figure 4:
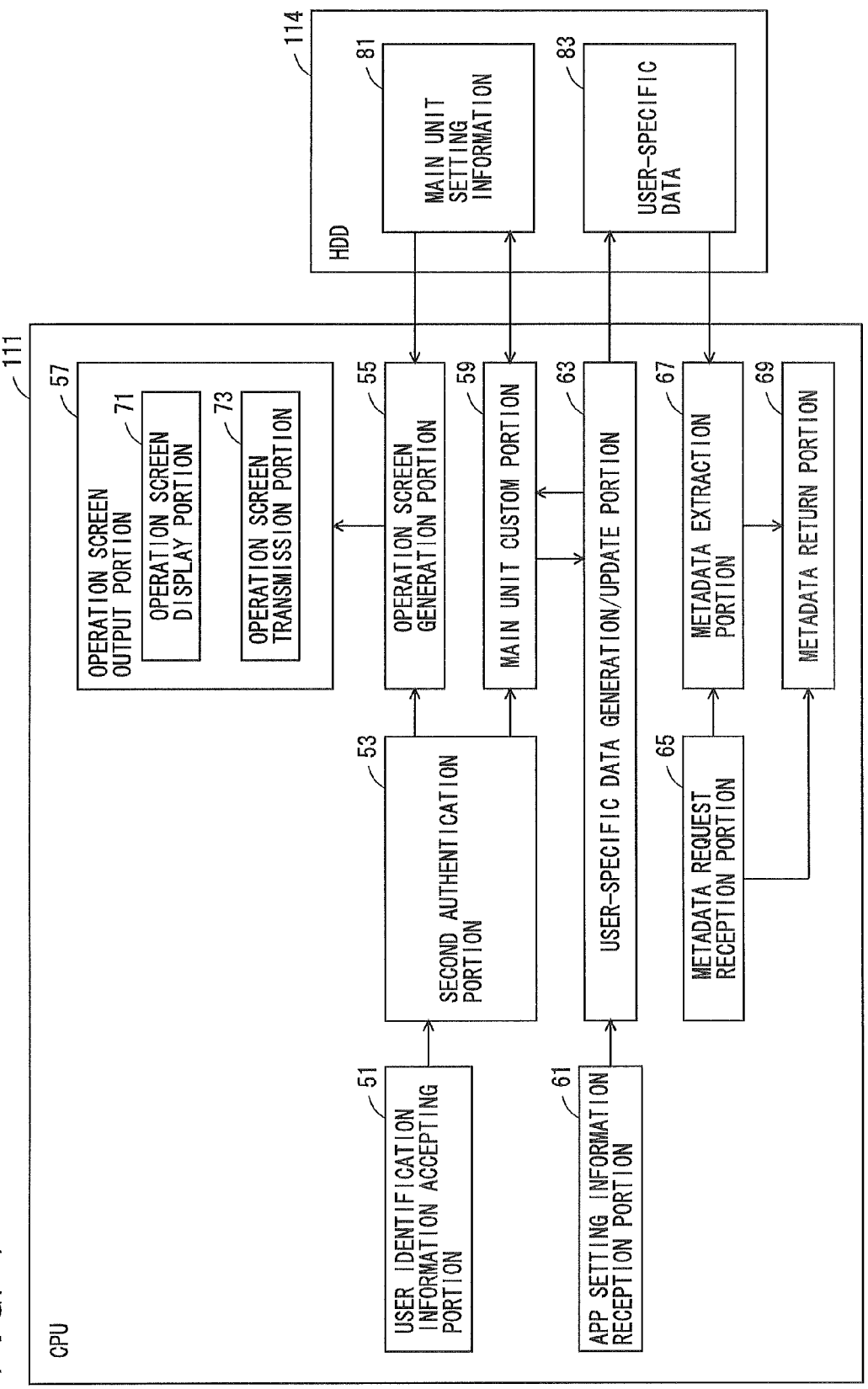
FIG. 4 is a block diagram showing an example of overall functions of a CPU of the MFP.

FIG. 4 is a block diagram showing an example of overall functions of the CPU of the MFP. The functions of CPU 111 of MFP 100 are formed in CPU 111 when CPU 111 executes a program stored in ROM 112, HDD 114, or CD-ROM 119. Referring to FIG. 4, CPU 111 includes a user identification information accepting portion 51 accepting user identification information, a second authentication portion 53 authenticating a user, an operation screen generation portion 55 generating an operation screen, an operation screen output portion 57 outputting an operation screen, a main unit custom portion 59, an app setting information reception portion 61 externally receiving app setting information, a user-specific data generation/update portion 63 updating user-specific data, a metadata request reception portion 65 externally receiving a metadata request, a metadata extraction portion 67, and a metadata return portion 69.

User identification information accepting portion 51 accepts the user identification information and password input to operation portion 116, or the externally transmitted user identification information and password. Upon accepting the user identification information and password, user identification information accepting portion 51 outputs the set of user identification information and password to second authentication portion 53.

When the user inputs the user identification information and password to operation portion 116, user identification information accepting portion 51 accepts the input user identification information and password. Here, a plurality of user identification information registered beforehand may be displayed on display portion 115, and an operation to select one of a plurality of displayed user identification information may be input to operation portion 116. When an application program for remotely controlling MFP 100 is executed in PCs 200, 200A-200C as described later, network I/F 117 receives user identification information and passwords transmitted from PCs 200, 200A-200C, and the received user identification information is then accepted. In a manner in which MFP 100 functions as a Web server and PCs 200, 200A-200C function as clients by executing a browsing program, MFP 100 may transmit a Web page including a log-in screen, and network I/F 117 may receive user identification information and passwords transmitted from PCs 200, 200A-200C.

Second authentication portion 53 authenticates a user based on the user identification information and password input from user identification information accepting portion 51. Sets of user identification information and passwords of users permitted to use MFP 100 are stored beforehand in HDD 114, and a user is authenticated on condition that the set of user identification information and password input from user identification information accepting portion 51 is stored in HDD 114. When the user is authenticated, second authentication portion 53 outputs the user identification information of the authenticated user to operation screen generation portion 55 and main unit custom portion 59.

Main unit custom portion 59 accepts a change of a first operation screen displayed on display portion 115. The first operation screen includes a plurality of setting items and areas for accepting parameters corresponding to a plurality of setting items. In the case where the user makes settings for operating MFP 100 in accordance with the first operation screen, a plurality of setting items included in the first operation screen include a setting item in which the same parameter is set every time and a setting item in which different parameters are set every time. For the setting item in which the same parameter is set every time, a default parameter is registered, thereby eliminating the need for changing parameters. Therefore, only the setting item in which parameters are frequently changed is included in the first operation screen, thereby facilitating the setting operation.

Main unit custom portion 59 displays a setting screen for accepting the setting as to whether or not to display each of a plurality of setting items included in the first operation screen on display portion 115, and accepts whether or not to display for each setting item as input by the user to operation portion 116 in accordance with the setting screen. Main unit custom portion 59 generates main unit setting information based on whether or not to display that is accepted for each setting item, and stores the main unit setting information in HDD 114. The main unit setting information includes information indicating whether to display each of a plurality of setting items included in the first operation screen. Main unit custom portion 59 stores the main unit setting information into HDD 114 in association with the user identification information input from second authentication portion 53. Since a plurality of first operation screens exist, the main unit setting information is stored in HDD 114 for each of the first operation screens. For example, the setting items included in the first operation screens are different between an operation screen for execution of a copy process and an operation screen for execution of a scan transmission process of transmitting image data obtained by scanning a document. Main unit custom portion 59 stores main unit setting information 81 into HDD 114 to indicate whether to display setting items for each user identification information and first operation screen.

FIG. 5 is a diagram showing an exemplary format of the main unit setting information. Referring to FIG. 5, main unit setting information 81 includes a user identification information field, an operation screen name field, a setting item field, and a display/not display field. User identification information for identifying a user is set in the user identification information field. A screen name assigned to a first operation screen is set in the operation screen name field. An item name of a setting item that is displayed by default in the first operation screen specified by the screen name set in the operation screen name field is set in the setting item field. Display/not display indicating whether or not to display the setting item having the item name set in the setting item field is set in the display/not display field, wherein "1" is set to display and "0" is set not to display.

Returning to FIG. 4, when new main unit setting information 81 is stored into HDD 114, main unit custom portion 59 outputs the newly stored main unit setting information 81 to user-specific data generation/update portion 63. When main unit setting information 81 already stored in HDD 114 is changed, main unit custom portion 59 outputs the changed main unit setting information 81 to user-specific data generation/update portion 63.

When user identification information is input from second authentication portion 53, operation screen generation portion 55 reads out main unit setting information 81 associated with the input user identification information from HDD 114 and generates a first operation screen based on the read main unit setting information 81. When MFP 100 functions as a Web server, operation screen generation portion 55 generates a second operation screen written in a markup language such as HTML (HyperText Markup Language). Operation screen generation portion 55 outputs the generated first operation screen or second operation screen to operation screen output portion 57.

Operation screen output portion 57 includes an operation screen display portion 71 and an operation screen transmission portion 73. When user identification information accepting portion 51 accepts user identification information from operation portion 116, operation screen display portion 71 displays the first operation screen input from operation screen generation portion 55 on display portion 115. When MFP 100 functions as a Web server, operation screen transmission portion 73 transmits the second operation screen input from operation screen generation portion 55 to a client through network I/F 117.

When new main unit setting information 81 is input from main unit custom portion 59, user-specific data generation/update portion 63 generates metadata based on the new main unit setting information 81. When the changed main unit setting information 81 is input from main unit custom portion 59, user-specific data generation/update portion 63 generates metadata based on the changed main unit setting information 81.

FIG. 6 is a diagram showing an exemplary format of metadata. Referring to FIG. 6, metadata includes a device name field, a function name field, a setting item field, and a display/not display field. Device identification information of the device that generates information based on which the metadata is generated is set in the device name field. When metadata is generated from main unit setting information 81, the device identification information of MFP 100 is set. When metadata is generated based on the app setting information transmitted from any of PCs 200, 200A-200C, the device identification information of the device that has transmitted the app setting information, among PCs 200, 200A-200C, is set.

A designation that specifies a function of MFP 100 is set in the function name field. Examples of designations are "copy" for the copy function and "transmission" for the data transmission function. The item name of the setting item corresponding to the function specified by the designation set in the function name filed is set. Display/not display is set in the display/not display field to indicate whether or not to display the setting item having the setting name set in the setting item field, wherein "1" is set to display and "0" is set not to display.

Returning to FIG. 4, when metadata is generated based on main unit setting information 81 input from main unit custom portion 59, user-specific data generation/update portion 63 sets the device identification information of MFP 100 in the device identification information filed of the metadata. Furthermore, user-specific data generation/update portion 63 specifies a function from the operation screen name included in main unit setting information 81, sets the designation of the specified function in the function name field of the metadata, sets the item name set in the setting item field of main unit setting information 81 in the setting item field of the metadata, and sets the value set in the display/not display item in the display/not display field of the metadata. As main unit setting information 81 includes at least one setting item and whether or not to display for each setting item, if a plurality of setting items are included in main unit setting information 81, the number of generated metadata is equal to the number of a plurality of setting items included in main unit setting information 81.

User-specific data generation/update portion 63 generates user-specific data that associates the generated data with the user identification information input from main unit custom portion 59 and stores the generated user-specific data into HDD 114. Thus, user-specific data 83 is stored in HDD 114. If the metadata only different in whether or not to display has already been stored in user-specific data 83 stored in HDD 114, user-specific data generation/update portion 63 updates the already stored metadata with the generated metadata. As updating main unit setting information 81 updates user-specific data 83, the execution setting items displayed by a plurality of application programs running on PCs 200, 200A-200C can be made the same as the setting items displayed on the first operation screen of MFP 100. When the same application program runs on PCs 200, 200A-200C, the execution setting items displayed at each of PCs 200, 200A-200C can be made the same as the setting items displayed on the first operation screen of MFP 100.

When network I/F 117 receives the app setting information and application name from any of PCs 200, 200A-200C, app setting information reception portion 61 obtains the app setting information and application name and the device identification information of the device that has transmitted the app setting information. App setting information reception portion 61 outputs a set of the obtained app setting information, application name, and device identification information to user-specific data generation/update portion 63. The app setting information, which will be described in detail later, includes user identification information, the setting item name, and whether or not to display.

When the app setting information, application name, and device identification information are input from app setting information reception portion 61, user-specific data generation/update portion 63 generates metadata based on the app setting information, application name, and device identification information. User-specific data generation/update portion 63 specifies the function name corresponding to the application program based on the application name, sets the specified function name in the function name field of the metadata, sets the setting item name included in the app setting information in the setting item field of the metadata, and sets whether or not to display included in the app setting information in the display/not display field of the metadata. The app setting information includes one or more sets of setting item names and whether or not to display for each user identification information and function name. Therefore, the number of generated metadata is equal to the number of sets of setting item names and whether or not to display that are included in the app setting information.

User-specific data generation/update portion 63 generates user-specific data that associates the generated metadata with the user identification information included in the app setting information, and stores the generated user-specific data into HDD 114. If metadata only different in whether or not to display has already been stored in user-specific data 83 stored in HDD 114, user-specific data generation/update portion 63 updates the already stored metadata with the generated metadata. As receiving the app setting information updates user-specific data 83, when the app setting information is received from any one of PCs 200, 200A-200C, for example, PC 200, the setting items displayed at the other PCs 200A-200C can be made the same as the setting items displayed at PC 200.

When user-specific data is to be updated with the metadata generated based on the app setting information, user-specific data generation/update portion 63 outputs the updated user-specific data to main unit custom portion 59. When user-specific data is input from user-specific data generation/update portion 63, main unit custom portion 59 generates main unit setting information based on the user-specific data and updates the main unit setting information 81 stored in HDD 114. Main unit custom portion 59 generates main unit setting information by setting the user identification information included in the user-specific data in the user identification information field of the main unit setting information, setting the function name of the metadata in the operation screen name field of the main unit setting information, and setting the values set in the setting item field and the display/not display field of the metadata in the setting item field and the display/not display field of the main unit setting information, respectively. Main unit custom portion 59 updates main unit setting information 81 stored in HDD 114 with the main unit setting information generated from the user-specific data. As receiving the app setting information and updating user-specific data 83 updates main unit setting information 81, when the app setting information is received from any one of PCs 200, 200A-200C, for example, PC 200, the setting items displayed on the first operation screen of MFP 100 can be made the same as the setting items of the second operation screen displayed at PC 200.

When network I/F 117 receives a metadata request from any of PCs 200, 200A-200C, metadata request reception portion 65 obtains the device identification information of the device that has transmitted the metadata request. Metadata request reception portion 65 outputs the received metadata request to metadata extraction portion 67 and outputs the obtained device identification information to metadata return portion 69. The metadata request includes the user identification information and the application program name.

Metadata extraction portion 67 extracts, from user-specific data 83 stored in HDD 114, the metadata associated with the user identification information included in the metadata request input from metadata request reception portion 65. Metadata extraction portion 67 then specifies the function name corresponding to the application program name included in the metadata request and further extracts, from the extracted metadata, the metadata in which the specified function name is set in the function name field. The extracted metadata is then output to metadata return portion 69.

Metadata return portion 69 outputs the metadata input from metadata extraction portion 67 and the device identification information input from metadata request reception portion 65 to network I/F 117 and transmits the metadata to one of PCs 200, 200A-200C that has transmitted the metadata request.

Figure 7:
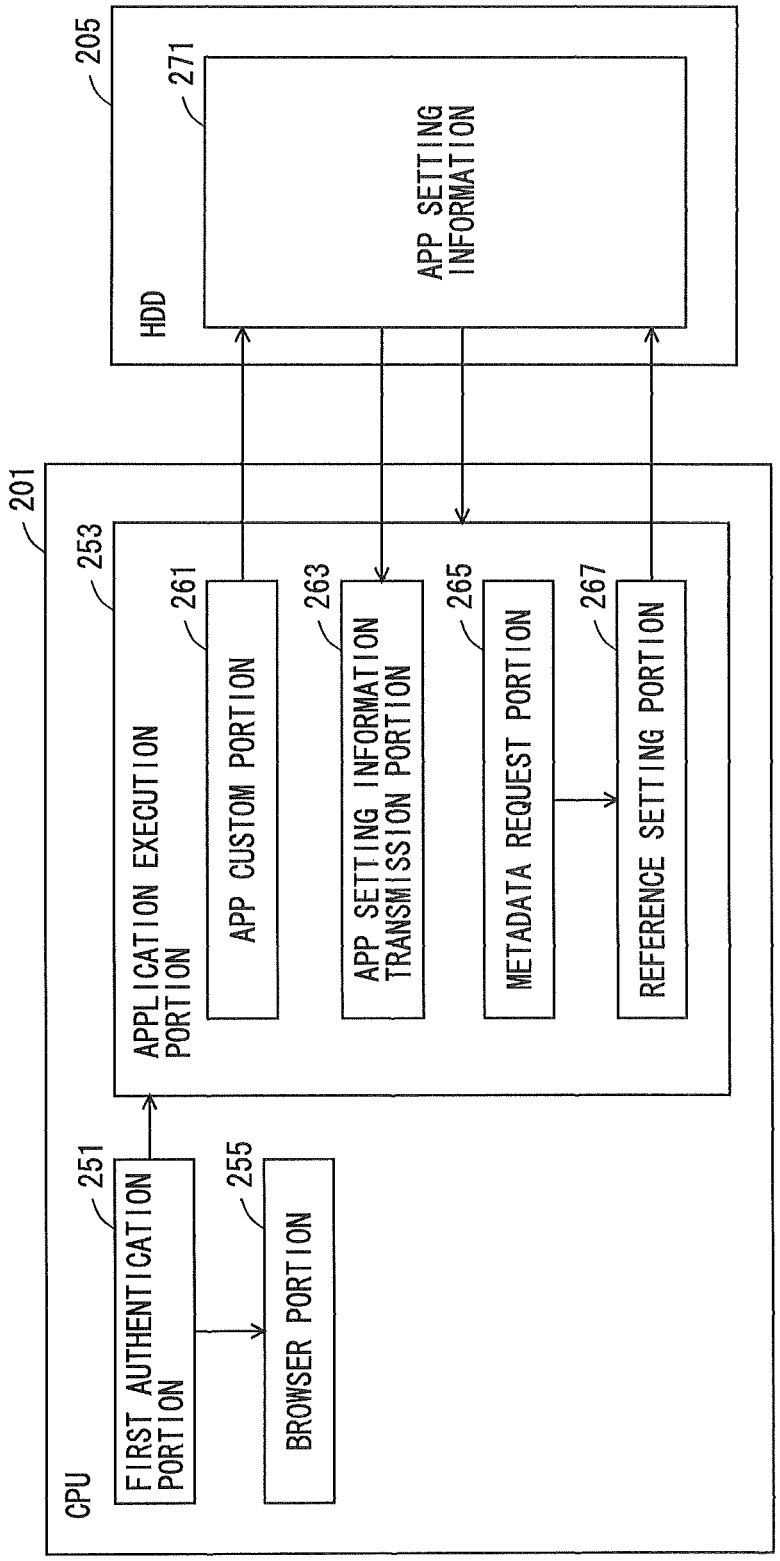
FIG. 7 is a block diagram showing an example of overall functions of a CPU of the PC.

FIG. 7 is a block diagram showing an example of overall functions of the CPU of the PC. The functions of CPU 201 of PC 200 are formed in CPU 201 when CPU 201 executes a program stored in ROM 202, HDD 205, or CD-ROM 209. Referring to FIG. 7, CPU 201 includes a first authentication portion 251 authenticating a user operating PC 200, an application execution portion 253, and a browser portion 255.

First authentication portion 251 authenticates a user based on the user identification information and password input by the user to operation portion 207. Sets of user identification information and passwords of users permitted to use PC 200 are stored beforehand in HDD 205. A user is then authenticated on condition that the set of user identification information and password input from operation portion 207 is stored in HDD 205. When the user is authenticated, first authentication portion 251 outputs the user identification information of the authenticated user to application execution portion 253 and browser portion 255. Here, the user inputs the user identification information to operation unit 207, by way of example. In this case, the user identification information registered beforehand may be displayed on display portion 206, and the user may input an operation of selecting the displayed user identification information to operation portion 207.

Browsing portion 255 is a task formed in CPU 201 when CPU 201 executes a browsing program stored in ROM 202, HDD 205, or CD-ROM 209. Browsing portion 255 stores beforehand the URL of MFP 100 functioning as a Web server, requests transmission of the Web page from MFP 100 through network I/F 204, and displays the Web page on display portion 206 when network I/F 204 receives the Web page from MFP 100.

Application execution portion 253 is a task formed in CPU 201 when CPU 201 executes an application program stored in ROM 202, HDD 205, or CD-ROM 209. The application program is a driver program for controlling MFP 100 or a remote control program for remote control. Here, the driver program is a printer driver program for allowing MFP 100 to perform the function of forming images of print data, and the remote control program is an image formation program for allowing MFP 100 to perform the function of forming images of image data or a transmission control program for allowing MFP 100 to perform the function of transmitting data to the outside.

Application execution portion 253 executes a plurality of application programs. The function of application execution portion 253 described here is a function common to a plurality of application programs. Specifically, application execution portion 253 includes an app custom portion 261, an app setting information transmission portion 263, a metadata request portion 265, and a reference setting portion 267.

App custom portion 261 accepts a change of the second operation screen displayed on display portion 206 by executing an application program. The second operation screen includes a plurality of setting items and areas for accepting parameters corresponding to a plurality of setting items. In the case where the user makes settings for operating MFP 100 in accordance with the second operation screen, a plurality of setting items included in the second operation screen include a setting item in which the same parameter is set every time and a setting item in which different parameters are set every time. A default parameter is registered for the setting item in which the same parameter is set every time, thereby eliminating the need for changing parameters. Therefore, only the setting item in which parameters are frequently changed is included in the second operation screen, thereby facilitating the setting operation.

When the user inputs a custom instruction to operation portion 207 to indicate whether or not to display each of a plurality of setting items included in the second operation screen, app custom portion 261 accepts the custom instruction. Upon accepting the custom instruction, app custom portion 261 generates app setting information indicating whether or not to display each setting item in accordance with the custom instruction and stores the generated app setting information into HDD 205. App setting information 271 is thus stored in HDD 205. App custom portion 261 stores app setting information 271 for each application program.

FIG. 8 is a diagram showing an exemplary format of the app setting information. Referring to FIG. 8, the app setting information includes a user identification information field, a setting item name field, and a display/not display field.

Returning to FIG. 7, app custom portion 261 generates the app setting information by setting the user identification information input from first authentication portion 251 in the user identification information of the app setting information, setting the item names of a plurality of setting items included in the second operation screen in the setting item field, and setting whether or not to display as determined by the custom instruction in the display/not display field.

To display at second operation screen, application execution portion 253 reads out app setting information 271 that includes the user identification information input from first authentication portion 251, if it is stored in HDD 205, and generates a second operation screen in accordance with app setting information 271 for display on display portion 206. Therefore, of a plurality of setting items included in the second operation screen, only the setting item for which the display/not display field is set to display "1" is displayed in the second operation screen.

When new app setting information 271 is stored into HDD 205 or when app setting information 271 is updated, app setting information transmission portion 263 transmits the newly stored app setting information 271 or the updated app setting information 271 together with the application program name to MFP 100 through network I/F 204. In order to do so, the network address of MFP 100 is stored beforehand.

When the user inputs a common custom instruction to operation portion 207, metadata request portion 265 accepts the common custom instruction and transmits a metadata request to MFP 100 through network I/F 204. The metadata request includes the user identification information input from first authentication portion 251 and the application program name. Metadata request portion 265 outputs a signal to reference setting portion 267 to indicate that the metadata request has been transmitted to MFP 100.

When network I/F 204 receives metadata from MFP 100 after the signal indicating that the metadata request has been transmitted to MFP 100 is input, reference setting portion 267 updates app setting information 271 stored in HDD 205 based on the received metadata. Reference setting portion 267 extracts, from app setting information 271 stored in HDD 205, app setting information 271 in which the user identification information input from first authentication portion 251 is set. When app setting information 271 is extracted, reference setting portion 267 updates the extracted app setting information 271 with the metadata received from MFP 100. The display/not display field of app setting information 271 in which the item name set in the setting item field of the metadata is set is overwritten with the value as to whether or not to display that is set in the display/not display field of the metadata.

When app setting information 271 in which the user identification information input from first authentication portion 251 is set is not extracted from app setting information 271 stored in HDD 205, reference setting portion 267 generates new app setting information and additionally stores the new app setting information into HDD 205. Reference setting portion 267 generates new app setting information by setting the user identification information input from first authentication portion 251 in the user identification information field of the app setting information, and setting the values in the setting item field and the display/not display field of the metadata in the corresponding fields of the app setting information.

When app setting information 271 stored in HDD 205 is updated by reference setting portion 267, to display a second operation screen, application execution portion 253 generates a second operation screen in accordance with the updated app setting information 271, and displays the generated second operation screen on display portion 206. Therefore, only the setting item set to display in the app setting information 271 that has been changed by the metadata is displayed on the second operation screen.

FIG. 9 is a diagram showing an example of a default operation screen. The second operation screen shown in FIG. 9 is one of second operation screens appearing when an application program having the application program name "PSDC" for remotely operating MFP 100 is executed in PC 200. Referring to FIG. 9, the second operation screen includes six setting items, namely, "number of copies," "duplex," "sort," "paper size," "staple," and "stamp," and includes an area for setting a parameter to the right of each of the six setting items. The setting item "number of copies" is a setting item for setting the number of prints. The setting item "duplex" is a setting item for setting printing on both sides of paper. The setting item "sort" is a setting item for setting sorting paper having images formed thereon. The setting item "paper size" is a setting item for setting a paper size. The setting item "staple" is a setting item for setting stapling. The setting item "stamp" is a setting item for setting stamp printing on paper.

FIG. 10 is a diagram showing an example of the customized second operation screen. The second operation screen shown in FIG. 10 is an example in which the default second operation screen shown in FIG. 9 is customized. Referring to FIG. 10, of the six setting items included in the default second operation screen shown in FIG. 9, included are three setting items "number of copies," "duplex," "sort" as well as the areas for setting parameters to the right of the three setting items. The three setting items "paper size," "staple," and "stamp" are deleted.

FIG. 11 is a diagram showing an example of metadata. The metadata shown in FIG. 11 is an example of metadata generated based on the app setting information transmitted from PC 200 when the default second operation screen shown in FIG. 9 is customized to the second operation screen shown in FIG. 10. Referring to FIG. 11, the metadata includes six records. Here, the device identification information of PC 200 is "PC_A." The function of the application program having the application program name "PSDC" has the function name "print."

In the first record, the item name "number of copies" is set in the setting item field to indicate the setting item for setting the number of prints, and "1" is set in the display/not display field to show that the setting item is to be displayed. In the second record, the item name "duplex" is set in the setting item field to indicate the setting item for setting printing on both sides of paper, and "1" is set in the display/not display field to show that the setting item is to be displayed. In the third record, the item name "sort" is set in the setting item field to indicate the setting item for setting sorting paper having images formed thereon, and "1" is set in the display/ not display field to show that the setting item is to be displayed. In the fourth record, the item name "paper size" is set in the setting item field to indicate the setting item for setting a paper size, and "0" is set in the display/not display field to show that the setting item is not to be displayed. In the fifth record, the item name "staple" is set in the setting item field to indicate the setting item for setting stapling, and "0" is set in the display/not display field to show that the setting item is not to be displayed. In the sixth record, the item name "stamp" is set in the setting item field to indicate the setting item for setting stamp printing on paper, and "0" is set in the display/ not display field to show that the setting item is not to be displayed.

Figure 12:
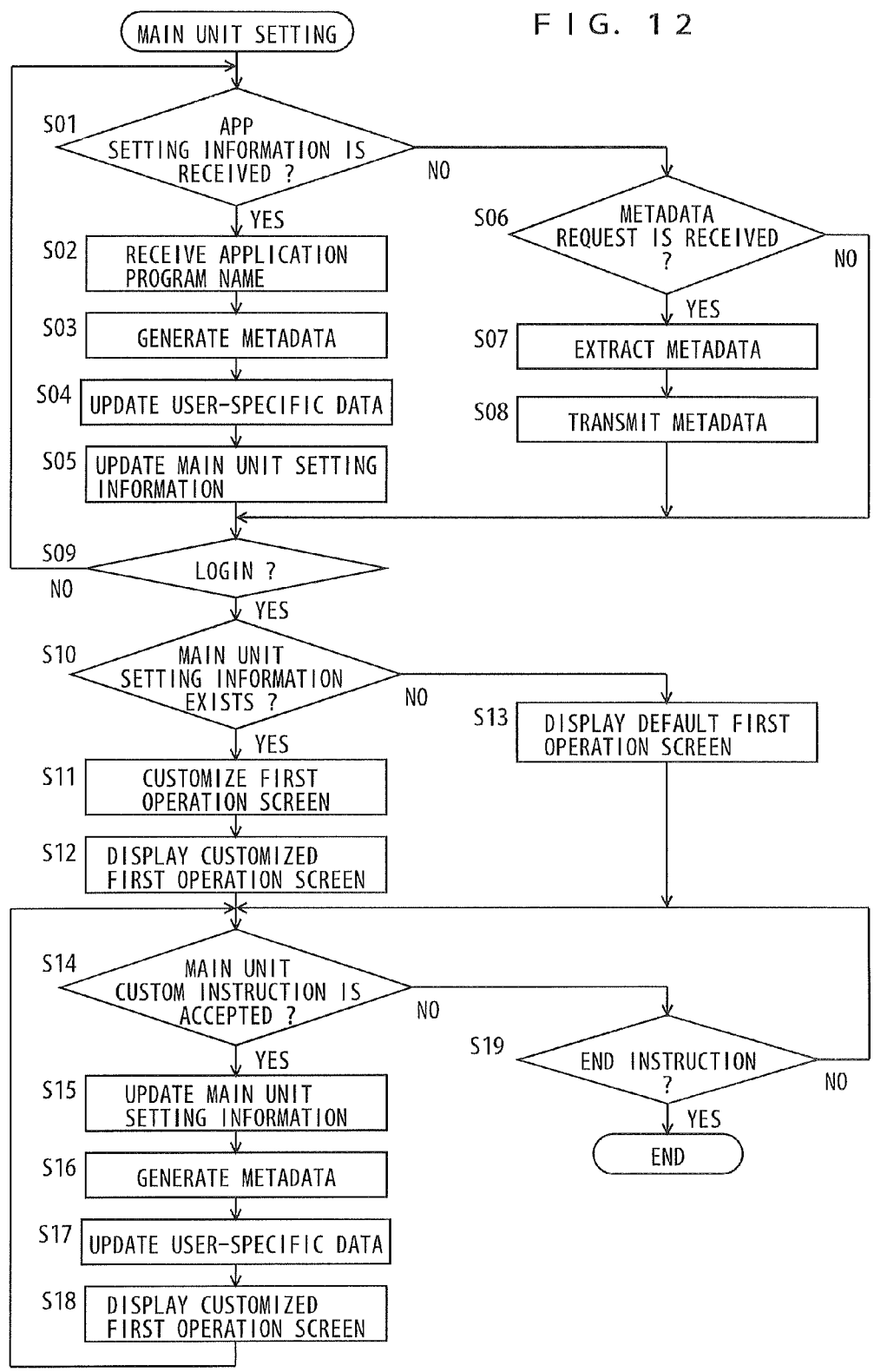
FIG. 12 is a flowchart showing an exemplary flow of a main unit setting process.

FIG. 12 is a flowchart showing an exemplary flow of a main unit setting process. The main unit setting process is a process executed by CPU 111 when CPU 111 of MFP 100 executes a program stored in ROM 112, HDD 114, or CD-ROM 119.

Referring to FIG. 12, CPU 111 determines whether app setting information has been received in step S18 (step S01). It is determined whether network I/F 117 has received app setting information from any of PCs 200, 200A-200C. If app setting information has been received from any of PCs 200, 200A-200C, the process proceeds to step S02. If not, the process proceeds to step S06. If app setting information is received in step S01, the device identification information of the device that has transmitted the app setting information is specified from among PCs 200, 200A-200C. Here, the app setting information has been received from PC 200, by way of example. In step S02, the application program name is received.

Then, metadata is generated based on the received app setting information and application program name and the device identification information (step S03). The function name corresponding to the application program is specified from the application name, and the specified function name is set in the function name field of the metadata. The setting item name included in the app setting information is set in the setting item field of the metadata. Whether or not to display as included in the app setting information is set in the display/not display field of the metadata. The app setting information includes one or more sets of setting item names and whether or not to display, for each user identification information and function name. Therefore, the number of generated metadata is equal to the number of sets of setting item names and whether or not to display that are included in the app setting information.

In the next step S04, user-specific data 83 stored in HDD 114 is updated based on the metadata generated in step S03. If the metadata different only in whether or not to display has already been stored in the user-specific data, user-specific data generation/update portion 63 updates the already stored metadata with the generated metadata. The metadata that includes the same user identification information as the user identification information included in the app setting information received in step S01 is extracted from user-specific data 83 stored in HDD 114, and the metadata different from the metadata generated in step S03 is replaced with the metadata generated in step S03. If in user-specific data 83 there exists no metadata that includes the same user identification information as the user identification information included in the app setting information received in step S01, user-specific data is generated in which the user identification information included in the app setting information received in step S01 is associated with the metadata generated in step S03. The generated user-specific data is stored additionally to user-specific data 83 stored in HDD 114.

In the next step S05, main unit setting information 81 stored in HDD 114 is updated based on user-specific data 83 updated in step S04, and the process then proceeds to step S09. Main unit setting information 81 is updated by generating main unit setting information based on user-specific data 83 updated in step S04. Specifically, the main unit setting information is generated by setting the user identification information included in the user-specific data in the user identification information field of the main unit setting information, setting the function name of the metadata in the operation screen name field of the main unit setting information, and setting the values set in the setting item field and the display/not display field of the metadata in the setting item field and the display/not display field of the main unit setting information, respectively. Then, main unit setting information 81 stored in HDD 114 is updated with the generated main unit setting information.

On the other hand, in step S06, it is determined whether a metadata request has been received. It is determined whether network I/F 117 has received a metadata request from any of PCs 200, 200A-200C. If a metadata request has been received from any of PCs 200, 200A-200C, the process proceeds to step S07. If not, the process proceeds to step S09. In step S06, the device identification information of the device that has transmitted the metadata request is specified from among PCs 200, 200A-200C. Here, the metadata request has been received from PC 200, by way of example. The metadata request includes the user identification information and the application program name.

In the next step S07, metadata is extracted. Specifically, metadata that is associated with the user identification information included in the received metadata request is extracted from user-specific data 83 stored in HDD 114. Then, the function name corresponding to the application program name included in the metadata request is specified, and the metadata in which the specified function name is set in the function name field is further extracted from the extracted metadata.

In the next step S08, the extracted metadata is transmitted to PC 200 that has transmitted the metadata request, through network I/F 117. The process then proceeds to step S09.

In step S09, it is determined whether a user has logged in. If a user logs in (YES in step S09), the process proceeds to step S10. If not, the process returns to step S01. The user identification information and password input by the user to operation portion 116 are accepted, or the user identification information and password externally received by network I/F 117 are accepted. If the authentication is successful, it is determined that the user has logged in.

In step S10, it is determined whether the main unit setting information of the log-in user exists. It is determined whether main unit setting information 81 including the user identification information of the log-in user exists in main unit setting information 81 stored in HDD 114. If main unit setting information 81 of the log-in user is stored in HDD 114, that main unit setting information 81 is read out, and the process proceeds to step S11. If not, the process proceeds to step S13. In step S11, the first operation screen is customized by generating a first operation screen for the log-in user based on the read main unit setting information 81. Then, the customized first operation screen is displayed on display portion 115 (step S12), and the process proceeds to step S14. On the other hand, in step S13, the default first operation screen is displayed on display portion 115, and the process proceeds to step S14. The default first operation screen is a first operation screen registered beforehand.

In step S14, it is determined whether the main unit custom instruction is accepted. The main unit custom instruction is accepted when the user inputs a setting operation to operation portion 116 at the stage when the first setting screen for changing the setting items in the first operation screen is displayed on display portion 115. If the main unit custom instruction is accepted, the process proceeds to step S15. If not, the process proceeds to step S19.

In step S15, the main unit setting information is updated. The main unit setting information is updated by generating main unit setting information based on the main unit custom instruction accepted in step S14 and storing the generated main unit setting information into HDD 114. The main unit setting information includes the user identification information of the log-in user, the screen name of the first operation screen having the setting items changed, all the setting items included in the first operation screen, and whether or not to display for each setting item. If the main unit setting information that includes the user identification information of the log-in user is stored in HDD 114, that main unit setting information is updated. If not stored, the main unit setting information is newly stored.

In the next step S16, metadata is generated based on the updated main unit setting information. Specifically, the device identification information of MFP 100 is set in the device name field of the metadata, the designation of a predetermined function corresponding to the first operation screen is set in the function name field, the field name of the setting item included in the main unit setting information is set in the setting item name field, and whether or not to display corresponding to the setting item name is set in the display/not display field.

In the next step S17, user-specific data 83 stored in HDD 114 is updated based on the metadata generated in step S16. The metadata that includes the user identification information of the log-in user is extracted from user-specific data 83, and then the metadata different from the metadata generated in step S16 is replaced by the metadata generated in step S16. If the metadata that includes the user identification information of the log-in user does not exist in user-specific data 83, user-specific data is generated in which the user identification information of the log-in user is associated with the metadata generated in step S16, and is then stored additionally to user-specific data 83 stored in HDD 114.

In the next step S18, the first operation screen is customized by generating a first operation screen based on the main unit setting information updated in step S14 and is displayed on display portion 115. The process then returns to step S14. When the main unit custom instruction is accepted in step S14, the default first operation screen is customized in accordance with the custom instruction, and in addition, main unit setting information 81 is updated. Furthermore, metadata is generated from main unit setting information 81, and user-specific data 83 is updated. Therefore, the metadata included in user-specific data 83 reflects the custom instruction input by the user.

On the other hand, in step S19, it is determined whether an end instruction is accepted. When the user presses the end key preset in operation portion 116, the end instruction is accepted. If the end instruction is accepted, the main unit setting process ends. If not, the process returns to step S14.

Figure 13:
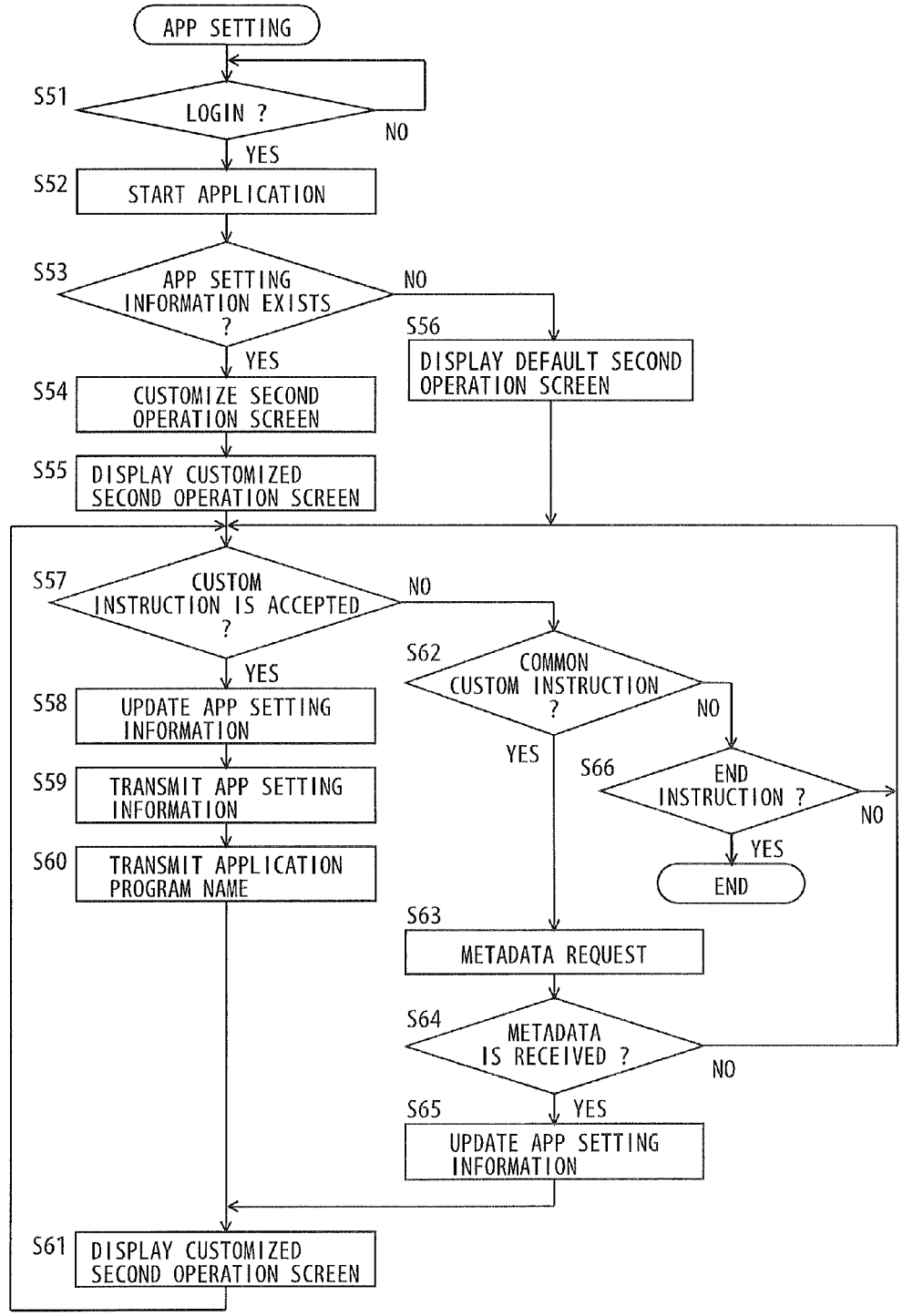
FIG. 13 is a flowchart showing an exemplary flow of an app setting process.

FIG. 13 is a flowchart showing an exemplary flow of an app setting process. The app setting process is a process executed by CPU 201 when CPU 201 of each of PCs 200, 200A-200C executes a browsing program or an application program stored in ROM 202, HDD 205, of CD-ROM 209. Here, the process executed by CPU 201 of PC 200 will be described by way of example.

Referring to FIG. 13, CPU 201 determines whether a user has logged in (step S51). The process waits until the user logs in (NO in step S51). When the user logs in (YES in step S51), the process proceeds to step S52. The user identification information and password input by the user to operation portion 116 are accepted, and if authentication is successful, it is determined that the user has logged in.

In step S52, an application program is started. In the next step S53, it is determined whether app setting information exists. It is determined whether there exists, in app setting information 271 stored in HDD 205, app setting information 271 that corresponds to the application program started in step S52 and includes the user identification information of the log-in user. If such app setting information 271 is stored in HDD 205, that app setting information 271 is read out, and the process proceeds to step S54. If not, the process proceeds to step S56.

In step S54, the second operation screen is customized by generating a second operation screen for the log-in user based on app setting information 271 read out in step S53. Then, the customized second operation screen is displayed on display portion 206 (step S55), and the process proceeds to step S57. On the other hand, in step S56, the default second operation screen is displayed on display portion 206, and the process proceeds to step S57. The default second operation screen is a second operation screen registered beforehand.

In step S57, it is determined whether the custom instruction is accepted. The custom instruction is accepted when the user inputs a setting operation to operation portion 207 at the stage when the second setting screen including the setting items to be changed is displayed on display portion 206. If the custom instruction is accepted, the process proceeds to step S58. If not, the process proceeds to step S62.

In step S58, the app setting information is updated. The app setting information is updated by generating app setting information based on the custom instruction accepted in step S57 and storing the generated app setting information into HDD 205. The app setting information includes the user identification information of the log-in user, all the setting items included in the second operation screen, and whether or not to display for each setting item. If app setting information 271 that includes the user identification information of the log-in user is stored in HDD 205, that app setting information 271 is updated. If not stored, the app setting information is newly stored.

In the next step S59, the updated app setting information is transmitted to MFP 100 through network I/F 204. The network address of MFP 100 is stored beforehand in HDD 205. In the next step S60, the program name of the application program started in step S52 is transmitted, and the process proceeds to step S61.

On the other hand, in step S62, it is determined whether the common custom instruction is accepted. The common custom instruction is accepted if the user performs an operation of designating the common custom key preset in operation portion 207. If the common custom instruction is accepted, the process proceeds to step S63. If not, the process proceeds to step S66.

In step S63, a metadata request including the user identification information of the log-in user and the application program name of the application program started in step S52 is transmitted to MFP 100 through network I/F 204. Then, it is determined whether network I/F 204 receives metadata from MFP 100 (step S64). If metadata is received, the process proceeds to step S65. If not, the process returns to step S57.

In step S65, the app setting information stored in HDD 205 is updated based on the received metadata, and the process proceeds to step S61. Specifically, if app setting information 271 that includes the user identification information of the log-in user is stored in HDD 205, the setting item field and the display/not display field of that app setting information 271 are updated with the values set in the setting item field and the display/not display field of the metadata, respectively. If app setting information 271 that includes the user identification information of the log-in user is not stored in HDD 205, new app setting information is generated from the user identification information of the log-in user and the metadata, and the generated app setting information is added to app setting information 271.

In step S61, the second operation screen is customized by generating a second operation screen based on the app setting information updated in step S58 or the app setting information updated in step S65, and the customized second operation screen is displayed on display portion 206. The process then returns to step S57. In step S57, when the custom instruction is accepted, app setting information 271 is updated, and in addition, the second operation screen is displayed in which the default second operation screen is customized in accordance with the custom instruction. Furthermore, when the common custom instruction is accepted, metadata is received from MFP 100, and the app setting information is updated based on the metadata. In addition, the second operation screen is displayed in which the default second operation screen is customized in accordance with the metadata.

On the other hand, in step S66, it is determined whether an end instruction is accepted. The end instruction is accepted when the user presses the end key preset in operation portion 207. If the end instruction is accepted, the app setting process ends. If not, the process returns to step S57.

As described above, in information processing system 1 in the present embodiment, in response to a metadata request received from any of PCs 200, 200A-200C, MFP 100 extracts the metadata associated with the user identification information included in the metadata request from user-specific data stored in HDD 114 and returns the extracted metadata. Each of PCs 200, 200A-200C executes an execution application selected from a plurality of application programs for remotely controlling MFP 100 and sets whether to display a plurality of execution setting items that can be set in the execution application program, among a plurality of setting items, based on the metadata received from MFP 100 in response to the metadata request including the user identification information of the log-in user being transmitted to MFP 100. Therefore, PCs 200, 200A-200C each can set whether or not to display the execution setting items that can be set in a plurality of setting items, based on the metadata stored in MFP 100. Furthermore, it can be set such that the same execution setting items display among PCs 200, 200A-200C.

Since user-specific data 83 is updated in response to main unit setting information 81 of MFP 100 being changed, the same setting items as the setting items included in the first operation screen displayed at MFP 100 can be included in the second operation screen displayed in a plurality of application programs running on each of PCs 200, 200A-200C.

Furthermore, user-specific data 83 is updated in MFP 100 when whether to display a plurality of execution setting items that can be set in the application program running on each of PCs 200, 200A-200C is set. Therefore, the same setting items as the execution setting items included in the second operation screen displayed at each of PCs 200, 200A-200C can be included in the second operation screen displayed in a different application program running on each of PCs 200, 200A-200C.

When user-specific data 83 is updated, main unit setting information 81 is updated based on the updated user-specific data 83, so that the setting items in the first operation screen displayed at MFP 100 can be made the same as the execution setting items in the second operation screen displayed at each of PCs 200, 200A-200C.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing system including a peripheral device at least having a printer function and an information processing apparatus controlling the peripheral device, said peripheral device comprising:
   a display portion to display a first operation screen for setting parameters in a plurality of setting items;
   a process execution portion to execute prescribed processing in accordance with the parameters set in said plurality of setting items;
   a storage portion to store user-specific data in which user identification information for identifying a user is associated with metadata indicating whether to display each of said plurality of setting items; and
   a metadata return portion to refer to said user-specific data in response to reception of a metadata request from said information processing apparatus and to extract and return metadata associated with user identification information included in said received metadata request,
   said information processing apparatus comprising:
   a first authentication portion to authenticate a user;
   an execution portion to execute an execution application selected from a plurality of application programs for remotely controlling said peripheral device;
   a metadata request portion to transmit a metadata request including user identification information of said authenticated user to said peripheral device, in response to acceptance of a custom instruction for execution setting items included in a second operation screen of the execution application by the user authenticated by said first authentication portion; and
   a reference setting portion to set whether to display a plurality of execution setting items that can be set in said execution application, among said plurality of setting items, based on said metadata received from said peripheral device in response to transmission of said metadata request.

2. The information processing system according to claim 1, said peripheral device further comprising:
   a second authentication portion to authenticate a user;
   a main unit custom portion to set whether to display a plurality of setting items included in said first operation screen, in accordance with an operation by the user authenticated by said second authentication portion, and to store main unit setting information that includes said whether to display a plurality of setting items and user identification information of the user authenticated by said second authentication portion; and
   a user-specific data generation/update portion to, in response to said main unit setting information being changed, generate metadata based on said changed main unit setting information, and to update user-specific data that includes user identification information included in said changed main unit setting information, based on said generated metadata.

3. The information processing system according to claim 1, said information processing apparatus further comprising:
   an app custom portion to set whether to display the execution setting items included in the second operation screen of the execution application and to store app setting information that includes said whether to display a plurality of execution setting items and user identification information of said authenticated user; and
   an app information transmission portion to transmit said app setting information to said peripheral device in response to said app setting information being changed,
   wherein said user-specific data generation/update portion of said peripheral device generates metadata based on said app setting information, in response to said app setting information being received from said information processing apparatus, and updates user-specific data that includes user identification information included in said app setting information, based on said generated metadata.

4. The information processing system according to claim 3, said peripheral device further comprising:
   a second authentication portion to authenticate a user; and
   a main unit custom portion to set whether to display a plurality of setting items included in said first operation screen in accordance with an operation by the user authenticated by said second authentication portion, and to store main unit setting information that includes said whether to display a plurality of setting items and user identification information of the user authenticated by said second authentication portion,
   wherein when said user-specific data is updated by said user-specific data generation/update portion, said main unit custom portion updates said main unit setting information based on said updated user-specific data.

5. The information processing system according to claim 1, wherein
   the information processing system includes a plurality of said information processing apparatuses, and
   said metadata return portion returns metadata in response to reception of a metadata request from any of said plurality of information processing apparatuses.

6. The information processing system according to claim 5, wherein said user-specific data generation/update portion of said peripheral device updates said user-specific data in response to reception of said app setting information from any of said plurality of information processing apparatuses.

7. The information processing system according to claim 1, wherein said peripheral device is an image forming apparatus.

8. An information processing apparatus controlling a peripheral device at least having a printer function, said peripheral device storing user-specific data in which user identification information for identifying a user is associated with metadata indicating whether to display each of a plurality of setting items in which parameters are set in order that said peripheral device can execute prescribed processing, comprising:
   an authentication portion to authenticate a user;
   an execution portion to execute an execution application selected from a plurality of application programs for remotely controlling said peripheral device;
   a metadata request portion to transmit a metadata request including user identification information of said authenticated user to said peripheral device, in response to acceptance of a custom instruction for execution setting items included in an operation screen of the execution application by the user authenticated by said authentication portion; and
   a reference setting portion to set whether to display a plurality of execution setting items that can be set in said execution application program, among said plurality of setting items, based on said metadata received from said peripheral device in response to transmission of said metadata request.

9. The information processing apparatus according to claim 8, further comprising:
- an app custom portion to set whether to display the execution setting items included in the operation screen of the execution application and to store app setting information that includes whether to display said plurality of execution setting items and user identification information of said authenticated user; and
- an app information transmission portion to transmit said app setting information to said peripheral device in response to said app setting information being changed.

10. A setting item setting method executed in an information processing apparatus controlling a peripheral device at least having a printer function, said peripheral device storing user-specific data in which user identification information for identifying a user is associated with metadata indicating whether to display each of a plurality of setting items in which parameters are set in order that said peripheral device can execute prescribed processing, comprising the steps of:
- authenticating a user;
- executing an execution application selected from a plurality of application programs for remotely controlling said peripheral device;
- transmitting a metadata request including user identification information of said authenticated user to said peripheral device, in response to acceptance of a custom instruction for execution setting items included in an operation screen of the execution application by the user authenticated in said step of authenticating; and
- setting whether to display a plurality of execution setting items that can be set in said execution application program, among said plurality of setting items, based on said metadata received from said peripheral device in response to transmission of said metadata request.

11. The setting item setting method according to claim 10, further comprising the steps of:
- setting whether to display the execution setting items included in the operation screen of the execution application, and storing app setting information that includes said whether to display a plurality of execution setting items and user identification information of said authenticated user; and
- transmitting said app setting information to said peripheral device in response to said app setting information being changed.

12. A non-transitory computer-readable recording medium encoded with a setting item setting program performed by a computer, said computer being configured to control an information processing apparatus controlling a peripheral device at least having a printer function, said peripheral device storing user-specific data in which user identification information for identifying a user is associated with metadata indicating whether to display each of a plurality of setting items in which parameters are set in order that peripheral device can execute prescribed processing, said program causing said computer to execute the steps of:
- authenticating a user;
- executing an execution application selected from a plurality of application programs for remotely controlling said peripheral device;
- transmitting a metadata request including user identification information of said authenticated user to said peripheral device, in response to acceptance of a custom instruction for execution setting items included in an operation screen of the execution application by the user authenticated in said step of authenticating; and
- setting whether to display a plurality of execution setting items that can be set in said execution application program, among said plurality of setting items, based on said metadata received from said peripheral device in response to transmission of said metadata request.

13. The non-transitory computer-readable recording medium encoded with a setting item setting program according to claim 12, said program further causing said computer to execute the steps of:
- setting whether to display the execution setting items included in the operation screen of the execution application, and storing app setting information that includes said whether to display a plurality of execution setting items and user identification information of said authenticated user; and
- transmitting said app setting information to said peripheral device in response to said app setting information being changed.

* * * * *